INVENTORS
Edward A. Rockwell + Edwin R. Evans
BY
Arthur Wright
ATTORNEY

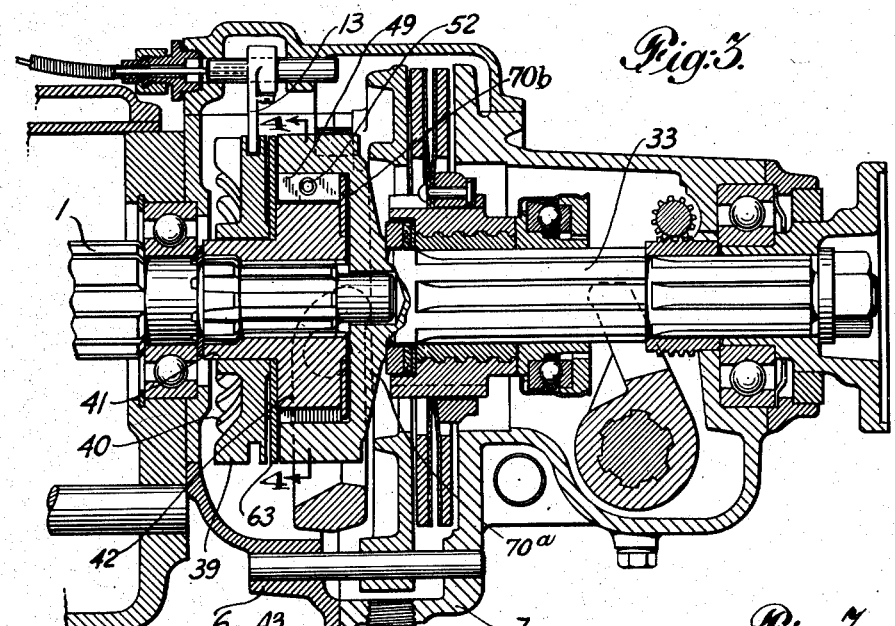
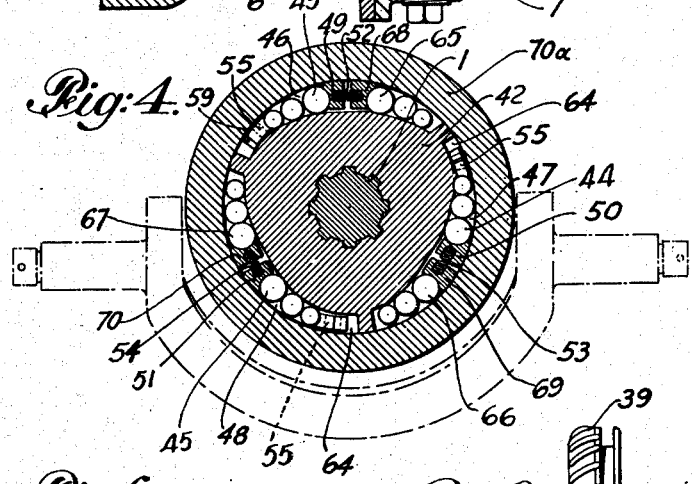
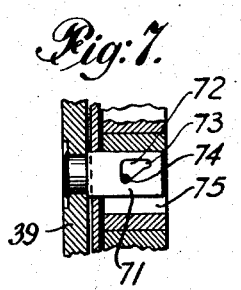
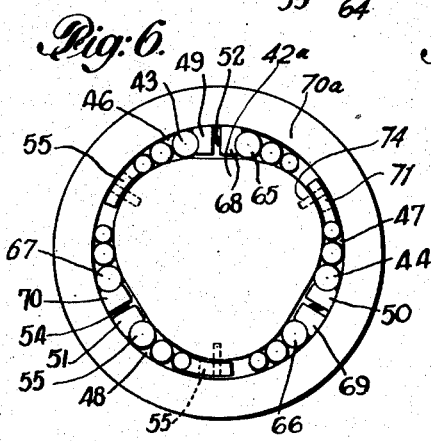
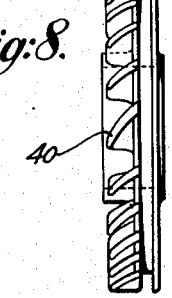

June 29, 1937.  E. A. ROCKWELL ET AL  2,085,606
FREEWHEELING KICK-OUT UPON REVERSE DRIVE
Filed April 12, 1933   3 Sheets-Sheet 3
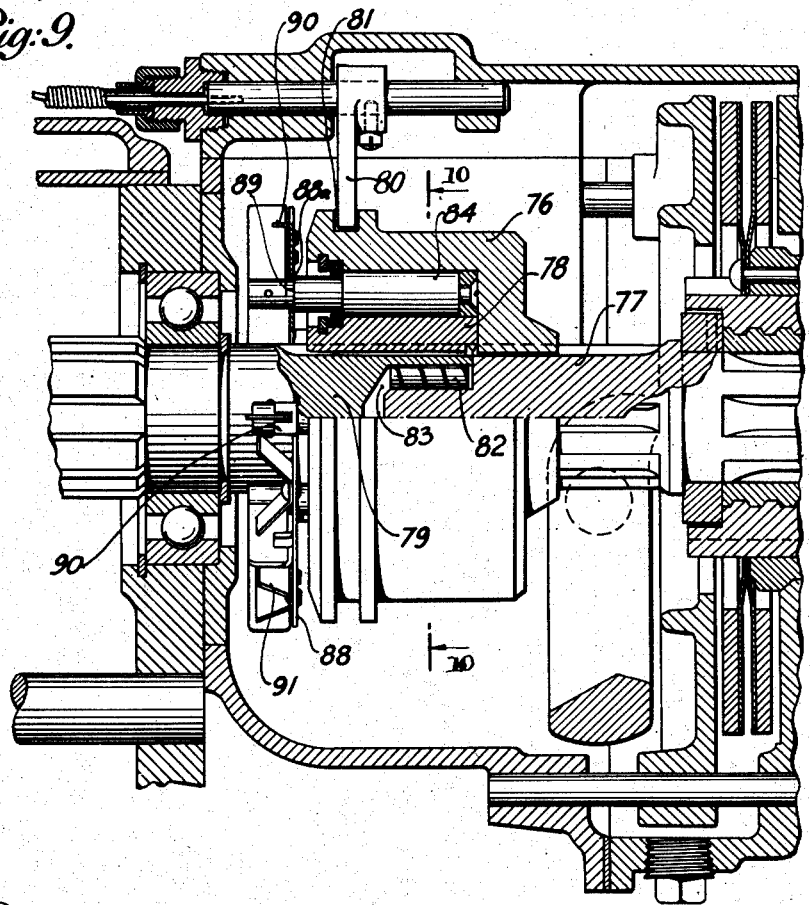
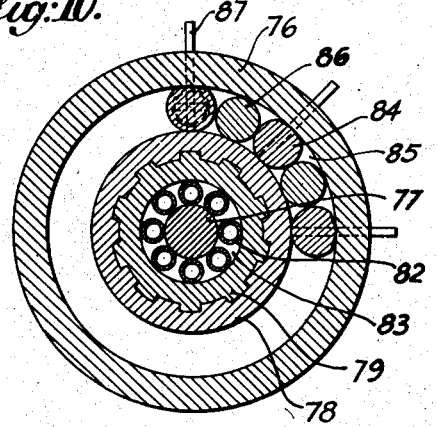
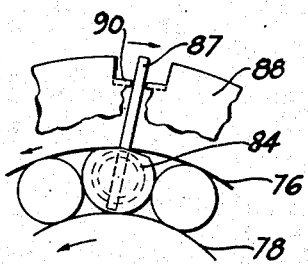
INVENTORS
Edward A. Rockwell & Edwin R. Evans
BY
Arthur Wright
ATTORNEY Patented June 29, 1937

2,085,606

UNITED STATES PATENT OFFICE 2,085,606

FREEWHEELING KICK-OUT UPON REVERSE DRIVE

Edward A. Rockwell and Edwin R. Evans, Chicago, Ill.; said Rockwell assignor, by mesne assignments, to General Auto Parts Corporation, a corporation of Delaware Application April 12, 1933, Serial No. 665,648

22 Claims. (Cl. 192—48)

Our invention relates particularly to a free wheeling apparatus for use with automotive engines in which there is provided a means for automatically throwing the free wheeling part of the apparatus out of action when the engine is driving in reverse.

The object of our invention is particularly to obviate the necessity of throwing a free wheeling device out of action manually when the engine is driving in reverse, as, for example, on automobiles when the automobile is being driven backwardly. Our invention is applicable to all types of engines and transmissions of various types which may be equipped with any desired type of clutch or free wheeling apparatus. However, one object is to provide means whereby, when the engine is driving in reverse, to cause the lag or drag on some element of the mechanism to eliminate the action of the free wheeling elements and bring about direct drive not involving the free wheeling action. Still another object is to utilize the lag or drag of some relatively displaceable member, the position of which is adapted to determine the action or inaction of the free wheeling feature of the apparatus. The lag referred to may be, for example, caused by frictional contact between the elements of the mechanism, or may be caused, as in one embodiment of our invention, by frictional engagement of one of the elements with the oil contained within the mechanism. Further objects of our invention will be observed from the detailed description of the same hereinafter.

While our invention is capable of being embodied in many different forms of apparatus, we have shown only certain forms thereof in the accompanying drawings, in which—

Fig. 3 is a longitudinal vertical section of a modified form of our apparatus;

Fig. 4 is a transverse vertical section thereof taken on line 4—4 of Fig. 3;

Fig. 5 is a longitudinal section of a portion of the apparatus of Fig. 4;

Fig. 6 is an elevation of a modified form of the keyed device;

Fig. 7 is a section of the apparatus shown in Fig. 6;

Fig. 8 is an elevation of the free wheeling operating ring used in the form of our invention shown in Figs. 3 to 7;

Fig. 9 is a vertical longitudinal section of another modified form of the invention;

Fig. 10 is a cross-section through a portion thereon on line 10—10 of Fig. 9; and Fig. 11 is an elevation of a detail thereof.

Figure 1:
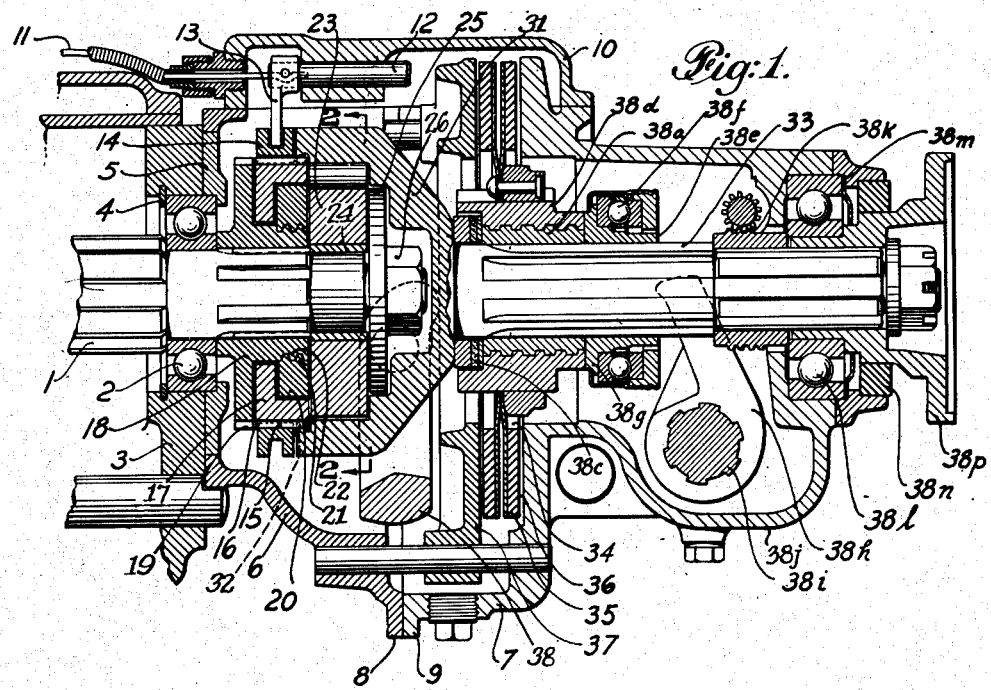
Fig. 1 is a longitudinal vertical section of one form of our apparatus.
Figure 2:
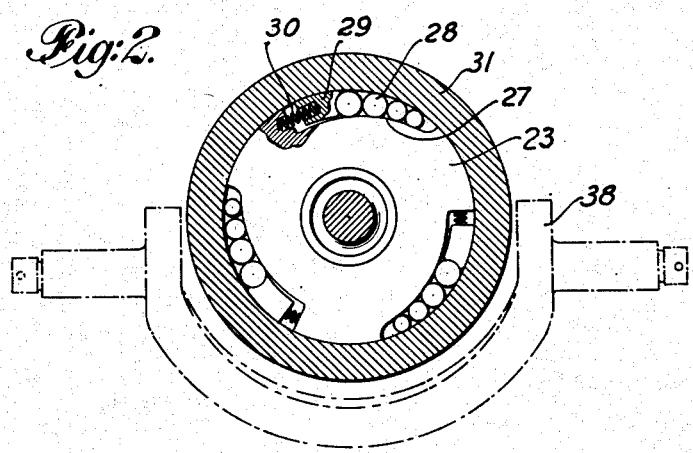
Fig. 2 is a transverse vertical section thereof taken on line 2—2 of Fig. 1.

Referring to the form of our invention shown in Figs. 1 and 2, we have shown a shaft 1 adapted to be connected to the engine by any desired type of gear-shift mechanism having means for operating the shaft 1 in a clockwise direction on the forward drive of the car, or in the opposite direction when driving in reverse. Said shaft is carried in usual bearings 2 supported in a housing 3 and maintained in place by a split ring 4 and a flanged ring 5. A separable two-part casing 6 and 7, provided with flanges 8 and 9 secured together in any desired manner, is adapted to enclose the clutch, free wheeling and keyed mechanism, a cover plate 10 being provided on the upper part of the casing 6 and 7 to support a flexible pull and push rod 11, the outer end of which, not shown, is adapted to be located at any desired point for manual operation by the driver of an automobile, as, for example, on the dash of the car. The inner end of said flexible rod 11 passes into the cover 10 through the usual supporting parts and is fixedly secured within a slidable rod 12 having a downwardly directed arm 13 tightly secured thereon for the purpose of manually controlling the free wheeling mechanism. The said arm 13 is located within a grooved ring 14 having internal teeth 15 which mesh with similar teeth 16 on a cupped ring 17 rotatably mounted on a ring 18 splined to the shaft 1 and having teeth 19 adapted to mesh with the teeth 15 on the grooved ring 14, when said ring is moved to the left, in Fig. 1, into a position where the free wheeling is locked out of position. Adjacent to the cupped ring 17 there is an internal worm ring 20 having a left-hand thread 21 on the inner surface thereof to mesh with a similar external worm 22 on the ring 18. A loose ring 23 is also mounted on the shaft 1 adjacent to the worm ring 20, and is provided with a bushing 24, the same being held in place by a nut ring 25 and a nut 26. As will be seen in Fig. 2, the ring 23 provides the inner portion of the free wheeling mechanism by having three tapered peripheral recesses 27, each carrying a series of graduated rollers 28 normally forced toward the narrow portion of the recess by a spacer 29 backed by a spring 30. These rollers 28 cooperate with the inside of a cup-shaped member 31 having a set of internal teeth 32 which mesh with the teeth 16 on the ring 17. The cup-shaped member 31 is carried on a usual stud shaft 32 having any desired type of brake operating clutch 34 comprising a friction disk 35 adapted to be moved against a stationary surface 36 of the casing 7 by means of a pressure plate 37 actuated by a pivoted yoke 38.

The brake operated by the friction disk 35 is comprised of an inner worm 38a loosely splined to the driven shaft 32 having secured thereto a sleeve stop 38c. An outer worm 38d cooperates with the worm of the inner worm 38a, said outer worm 38d being loosely splined to the friction disk 35. A sleeve 38e is also loosely splined to the shaft 32, on which sleeve 38e there is carried a ball-bearing 38f and a flanged ring 38g which contacts with an output yoke 38h on a cross-shaft 38i so as to transmit the force of the momentum of the car from one or the other of said worms, according to whether the car is moving forwardly or rearwardly, to the brakes of the car of any desired type. The casing 38j encloses these power brake parts, to the rear of which there are located a speedometer worm 38k, a driven shaft bearing 38l and ring closures 38m and 38n located around the end of a universal housing 38p.

In the operation of this form of our invention, when the shaft 1 is being driven forwardly by the engine, and when the free wheeling mechanism, comprising the ring 23, is not being utilized, the push rod 11 will have been withdrawn so as to bring the ring 14 into a position bridged between the ring 18 and the cupped ring 17 so that the drive will then take place through the ring 18 and the ring 17 and the cup-shaped member 31 to the shaft 32. When the free wheeling device is to be made operable the rod 11 is pushed inwardly so as to shift the grooved ring 14 away from the ring 18 until it overlies the cupped ring 17, whereupon the worms 21 and 22 will cause the ring 20 to fit tightly against the free wheeling ring 23 so that the drive will take place from the shaft 1 through the ring 18, worm ring 20, free wheeling ring 23 and cup-shaped member 31 to the shaft 32. Should the speed of the engine thereafter be slower than the momentum of the car, the cup-shaped member will be free to rotate faster than the free wheeling ring 23, thereby backing the rollers 28 into the wider portion of their recesses and permitting the car, thus, to proceed under its own momentum without retardation from the engine. When, however, the car is to be driven in reverse, and while the free wheeling mechanism is, thus, set to be operative in a forward direction, the shaft 1 will be rotated in the anti-clockwise direction, thus causing the worm ring 20 to be backed away from the free wheeling ring 23 and thus clamping the worm ring 20 to the cupped ring 17, whereupon the drive will take place through the shaft 1 from the ring 18, the worm ring 20, the cupped ring 17 and the cup-shaped member 31 to the shaft 32. In this way the apparatus acts as an automatic kick-off to throw the free wheeling mechanism out of action when the car is driven in reverse, without requiring any manual setting of the free wheeling elements.

In the modification of our invention as shown in Figs. 3 to 5 and 8, the construction is the same as in the preceding form of our invention except as follows: In this instance the arm 13, which is provided for controlling the free wheeling operation, extends into a grooved ring 39, which is provided with a series of radial vanes 40 adapted to dip within the oil located within the bottom of the housing 6 and 7 so as to produce a retarding action on said ring 39 in the manner hereinafter described, during the reverse drive of the engine. The said ring 39 is loosely mounted on a hub 41 of a free wheeling ring 42 which is keyed onto the shaft 1, which is shown in Fig. 4. Said ring 42 has three sets of free wheeling rollers, graduated in size, 43, 44 and 45. Each is carried within one of three peripherally tapered recesses 46, 47 and 48 and is normally urged toward the smaller portion of the recesses by spacers 49, 50 and 51 backed by springs 52, 53 and 54, respectively. At the smaller end of each of these tapered recesses there is provided a block member 55 having two wedging surfaces 56 and 57 with an intervening notch 58 so that the block member 55 is enabled to cooperate with a restraining member 59 having similar wedging surfaces 60 and 61. The restraining members 59 are secured by means of nuts 62 to the grooved ring 39, a retaining ring 63 being located between the grooved ring 39 and the free wheeling ring 42 to retain the different sets of rollers in place. It will be noted that the restraining member 59 is located in a very wide recess so as to leave a space 64 for the restraining member 59 to be rotatably retracted from the block member 55 when the car is driven in reverse in the manner hereinafter described. Furthermore, as will be noted in Fig. 4, the free wheeling ring 42 has three additional sets of graduated rollers 65, 66 and 67, backed by spacers 68, 69 and 70, which are arranged to normally move the sets of rollers 65, 66 and 67 into the narrow end of the recesses by the force of the springs 52, 53 and 54. All of these graduated sets of rollers 43, 44 and 45 and 65, 66 and 67 cooperate with the inner face of a cup-shaped member 70a formed at the end of the shaft 33 and having a roller retaining ring 70b secured between the same and the free wheeling ring 42.

The modified form of the construction shown in Figs. 6 and 7 provides a construction exactly the same as shown in Figs. 3 and 5 except that instead of the block 55 and the restraining member 59 there is used a slotted restraining member 71 having a triangular slot 72 with a lateral recess 73 to cooperate with a pin 74 carried by the free wheeling ring 42, said restraining member 71 being secured in any desired way to the grooved ring 39. Behind each of the restraining members 71 there is furthermore provided a recess 75 for the purpose hereinafter described.

In the operation of the form of our invention as shown in Figs. 3 to 5 and 8, when the shaft 1 is being driven forwardly and the free wheeling mechanism is moved to the position where it is in inoperative position, the grooved ring 39 will have been moved to the left of Fig. 3 by means of the manual push rod 11, thus engaging the inclined surfaces 60 and 61 with the inclined surfaces 56 and 57 by the lateral movement of the restraining member 59. The free wheeling ring 42 will then be tightly clamped to the cup-shaped member 70a in either direction of rotation by means of the different sets of rollers 43, 44 and 45 and 65, 66 and 67. When, however, the free wheeling apparatus is to be made operable the push rod 11 is pushed downwardly so as to shift the grooved ring 39 to the right of Fig. 3, thereby forcing the blocks 55 towards the wide ends of the recesses for the rollers in the free wheeling ring 42, where they are retained in this position by the relative positions of the blocks 55 and 59, as shown in Fig. 5. In this position of the parts, should the momentum of the car overrun the speed of the engine or should the engine speed be decreased below the speed of the car, the automobile will be able to proceed at a higher speed relative to the speed of the engine owing to the limited movement permitted for the sets of rollers 43, 44 and 45. In this position of the parts, however, should the shaft 1 be operated in reversed direction, as when driving the car rearwardly, there will be a lag in the grooved ring 39 due to the slow movement of the vanes 40 within the body of oil in the casing 6 and 7, thus moving the restraining members 59 back into the spaces 64 and thus freeing the blocks 55 from control of the adjacent series of rollers. In this way the free wheeling ring 42 will again become locked by friction to the cup-shaped member 70a, thus throwing the free wheeling elements out of operation.

The modified form of the restraining members shown in Figs. 6 and 7 operates the same as the form shown in Fig. 5, except that in this instance the restraining member 71 will hold the rollers adjacent thereto out of locking position except when the push rod 11 is moved to the left, when the extension recess 73 will overlie the pin 74, and except that when the car is moving forwardly and the parts are in free wheeling position, as shown in Fig. 7. When the car thereafter is driven in reverse, the lag of the grooved ring 39 will cause the restraining member 71 to be moved rearwardly into the space 75, thus causing the adjacent rollers to lock the free wheeling ring 42a to the cup-shaped member 70a.

It will be noted that in addition to the drag of the oil that the friction of control arm 13 in the groove of the member 39 will also act so as to cause a lag in the movement of the member 39 as long as the shaft 1 is rotating. Should this shaft cease to rotate then the oil drag within the cup-shaped member 70a will be sufficient to re-engage the rollers and permit the shaft 33 to pick up the shaft 1 and therefore turn the engine over should it have become stalled and therefore fail to continue to rotate the shaft 1.

In Figs. 9, 10 and 11 is shown a further modification of the free wheeling mechanism. A cupped or driven member 76 of the free wheeling unit is slidably splined to a driven shaft 77, while a driving or inner member 78 is slidably splined to a driving shaft 79, the splines on the driving and driven shaft being of the same dimensions. To effect a manual lockout of the free wheeling friction device the entire free wheeling unit is slid to the right by means of a finger 80 engaging a groove 81 in the driven member 76, causing the inner driving member 78 to engage the splines on the driven shaft 77, thus forming a direct driving connection between the driving shaft 79 and the driven shaft 77. The driven shaft 77 is supported on a pilot bearing 82 in a recess 83 in the driving shaft 79.

The normal free wheeling drive operates through flattened rollers 84, spaced apart in an annular recess 85 by spacer rollers 86. The flattened rollers 84 extend outwardly to the left, Fig. 9, and contain transverse slots in which are fixed rocking levers 87. A flat disk or ring 88, having guiding slots 88a allowing limited rotation on extensions 89 of the rollers 84, engages the rocking levers 87 through forks 90. Paddles 91 are fixed to the disk 88 so as to engage the lubricating oil, as set forth in the previous description.

In the operation of the device in Figs. 9, 10 and 11, as the driving member 79 revolves it tends to carry the rollers with it and thus to revolve the disk 88 through the levers 87. The revolution of the disk 88 is resisted by the drag of the oil on the paddles 91, causing the forks 90 to rock the levers 87, as shown in Fig. 11, thus bringing the flattened faces of the rollers 84 into camming relation with the driven ring 76. The rollers 84 wedge between the driving ring 78 and the driven ring 76, giving a positive drive in the counterclockwise or forward direction, as shown in Fig. 11. An increase of speed of the driven ring 76 over the driver 78 disengages the camming surfaces and free wheeling occurs. In reverse, the reverse motion of the disk 88 is resisted by the oil, rocking the levers 87 and bringing the rollers 84 into camming action to drive positively in the reverse direction in the same manner as described above.

While we have described our invention above in detail we wish it to be understood that many changes may be made therein without departing from the spirit of the same.

We claim:

1. An automotive device comprising means for driving the same forwardly or rearwardly including driving and driven members, a free wheeling apparatus containing a roller and pocket therefor adapted to grip on the forward drive thereof and means for throwing the free wheeling apparatus out of operation by the rearward driving thereof, adapted to drive rearwardly by frictional engagement between the driving and driven members, comprising a roller restraining element.

2. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward driving thereof, comprising a roller restraining element.

3. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element adapted to be actuated by the retarding action of a body of oil by which it is controlled.

4. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element adapted to be actuated by the retarding action of a body of oil by which it is controlled.

5. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element, having a series of fins, adapted to be actuated by the retarding action of a body of oil by which it is controlled.

6. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element, having a series of fins, adapted to be actuated by the retarding action of a body of oil by which it is controlled.

7. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element, having a series of fins, adapted to be actuated by the retarding action of a body of oil by which it is controlled and a block between the restraining element and the rollers.

8. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element, having a series of fins, adapted to be actuated by the retarding action of a body of oil by which it is controlled and a block between the restraining element and the rollers.

9. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element, having a series of fins, adapted to be actuated by the retarding action of a body of oil by which it is controlled and a block between the restraining element and the rollers, said restraining element and block having coacting wedging surfaces.

10. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element, having a series of fins, adapted to be actuated by the retarding action of a body of oil by which it is controlled and a block between the restraining element and the rollers, said restraining element and block having coacting wedging surfaces.

11. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element adapted to be rotatably retracted from said rollers by driving in reverse.

12. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element adapted to be rotatably retracted from said rollers by driving in reverse.

13. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element, said free wheeling apparatus containing also a roller and pocket operative in the opposite direction to the first-mentioned roller in order to provide for a positive drive in reverse.

14. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element, said free wheeling apparatus containing also a roller and pocket operative in the opposite direction to the first-mentioned roller in order to provide for a positive drive in reverse.

15. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element, said free wheeling apparatus containing also a roller and pocket operative in the opposite direction to the first-mentioned roller in order to provide for a positive drive in reverse, the two rollers having coacting spring-pressed spacers.

16. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element, said free wheeling apparatus containing also a roller and pocket operative in the opposite direction to the first-mentioned roller in order to provide for a positive drive in reverse, the two rollers having coacting spring-pressed spacers.

17. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element in the form of an element with a slot having a pin engagement with the free wheeling apparatus.

18. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element in the form of an element with a slot having a pin engagement with the free wheeling apparatus.

19. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element in the form of an element with a slot having a pin engagement with the free wheeling apparatus and adapted to be thrown into non-restraining position by driving in reverse.

20. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element in the form of an element with a slot having a pin engagement with the free wheeling apparatus and adapted to be thrown into non-restraining position by driving in reverse.

21. An automotive device comprising means for driving the same forwardly or rearwardly, including a free wheeling apparatus containing a roller and pocket therefor adapted to grip on the forward drive thereof and means for throwing the free wheeling apparatus out of operation by the rearward drive thereof, comprising a roller restraining element adapted to be locked manually into non-restraining position.

22. An automotive device comprising means for driving the same forwardly or rearwardly, including a free wheeling apparatus containing a roller and pocket therefor adapted to grip on the forward drive thereof, means for throwing the free wheeling apparatus into and out of operative position manually during the forward drive and means for throwing the free wheeling apparatus out of operation by the rearward drive thereof, comprising a roller restraining element adapted to be locked manually into non-restraining position.

EDWARD A. ROCKWELL.
EDWIN R. EVANS.